US012717417B2

(12) United States Patent
Wang et al.

(10) Patent No.: US 12,717,417 B2
(45) Date of Patent: Aug. 25, 2026

(54) BUTTON ASSEMBLY, TERMINAL DEVICE AND CONTROL METHOD

(71) Applicant: AAC Microtech (Changzhou) Co., Ltd., Changzhou City (CN)

(72) Inventors: Changliang Wang, Changzhou (CN); Dong Lu, Changzhou (CN); Lijin Zhang, Changzhou (CN); Wangwang Hu, Changzhou (CN)

(73) Assignee: AAG Microtech (Changzhou) Co., Ltd., Changzhou City (CN)

( * ) Notice: Subject to any disclaimer, the term of this patent is extended or adjusted under 35 U.S.C. 154(b) by 0 days.

(21) Appl. No.: 19/176,204

(22) Filed: Apr. 11, 2025

(65) Prior Publication Data

US 2026/0140571 A1 May 21, 2026

Related U.S. Application Data

(63) Continuation of application No. PCT/CN2024/133257, filed on Nov. 20, 2024.

(51) Int. Cl.
*G06F 3/01* (2006.01)
*G06F 3/02* (2006.01)

(52) U.S. Cl.
CPC ............ *G06F 3/016* (2013.01); *G06F 3/0202* (2013.01)

(58) Field of Classification Search
CPC ............................... G06F 3/016; G06F 3/0202
See application file for complete search history.

(56) References Cited

U.S. PATENT DOCUMENTS

2014/0144762 A1* 5/2014 Cheong .................. H01H 13/06 200/302.2

FOREIGN PATENT DOCUMENTS

| | | | | |
|---|---|---|---|---|
| CN | 103321891 A | * 9/2013 | | |
| CN | 110347251 A | * 10/2019 | ............ | G06F 3/016 |
| CN | 118398420 A | * 7/2024 | ............ | H01H 13/10 |

OTHER PUBLICATIONS

Machine translation of CN-103321891-A (Year: 2025).*
Machine translation of CN-110347251-A (Year: 2025).*
Machine translation of CN-118398420-A (Year: 2025).*

* cited by examiner

*Primary Examiner* — Michael Pervan
(74) *Attorney, Agent, or Firm* — Wiersch Law Group

(57) ABSTRACT

Provided is a button assembly, a terminal device, and a control method. The button assembly is for electrical connection to the terminal device and includes a base body with a through-hole, a touch assembly movably connected therein, and a vibration assembly in contact with the touch assembly. The touch assembly is exposed on one side of the through-hole and is configured to detect press information. The vibration assembly includes a base plate that supports the base body and encloses to form accommodating space, and a piezoelectric vibration portion on the base plate corresponding to the accommodating space. The accommodating space is in communication with the through-hole. One end of the touch assembly facing the vibration assembly is in the accommodating space and is connected to the piezoelectric vibration portion or the base plate. The button assembly enables the user to obtain diversified tactile feedback when pressing the touch assembly.

10 Claims, 6 Drawing Sheets

BUTTON ASSEMBLY, TERMINAL DEVICE AND CONTROL METHOD

TECHNICAL FIELD

The present disclosure relates to the field of button technologies, and particularly relates to a button assembly, a terminal device and a control method.

BACKGROUND

In related technologies, a physical button mainly includes a keycap and a dome, the principle is that the dome conducts a circuit after subjected to pressure. Pressing tactile sensation of the physical button is realized through a restoring force of mechanical deformation of the dome. However, its pressing tactile sensation and pressing effect are relatively single, which is unable to produce corresponding effects to match special usage scenarios.

Therefore, it is necessary to provide a button that can provide corresponding tactile feedback according to the corresponding usage scenarios.

SUMMARY

The objective of the present disclosure is to provide a button assembly, a terminal device, and a control method that can provide corresponding tactile feedback according to the corresponding usage scenarios.

In a first aspect, the present disclosure provides a button assembly, which is used for electrical connection to a terminal device. The button assembly includes a base body with a through-hole, a touch assembly movably connected within the through-hole, and a vibration assembly in contact with and connected to the touch assembly. The touch assembly is exposed on one side of the through-hole and is used to detect press information. The vibration assembly includes a base plate that elastically supports the base body and encloses to form an accommodating space together with the base body, and a piezoelectric vibration portion arranged on the base plate at a position corresponding to the accommodating space, and the accommodating space is in communication with the through-hole. One end of the touch assembly facing the vibration assembly is accommodated within the accommodating space and is connected to the piezoelectric vibration portion or the base plate. The piezoelectric vibration portion includes a first piezoelectric sheet and a second piezoelectric sheet respectively fixed on opposite surfaces of the base plate along a thickness direction. The first piezoelectric sheet faces the touch assembly and is connected to the touch assembly.

As an improvement, one of the first piezoelectric sheet and the second piezoelectric sheet is configured for electrical connection to a direct current voltage source, and the other one is configured for grounding.

As an improvement, the base plate is made of metal material and is configured for electrical connection to an alternating current voltage source.

As an improvement, the touch assembly includes a keycap passing through the through-hole from the accommodating space, and a sensor arranged on one side of the keycap facing the vibration assembly and connected to the piezoelectric vibration portion, and the sensor is configured to detect the press information.

As an improvement, the touch assembly further includes a support sheet fixed on one side of the sensor away from the keycap, and a spacer fixed on one side of the support sheet away from the sensor and connected to the piezoelectric vibration portion.

As an improvement, a thickness of the support sheet is 0.1 mm to 1 mm, and a thickness of the spacer is 0.1 mm to 0.5 mm.

As an improvement, a plurality of stoppers are arranged on one surface of the base plate facing the touch assembly, one end of each of the plurality of stoppers facing the touch assembly is spaced apart from the touch assembly.

As an improvement, the base body includes a housing with an accommodating groove and bolts arranged around the accommodating groove, both ends of the base plate along a length direction are provided with mounting holes, the base plate is fixedly connected to the housing via the bolts passing through the mounting holes, and the base plate and the accommodating groove enclose to form the accommodating space.

As an improvement, a thickness of the base plate is 0.05 mm to 0.5 mm.

In a second aspect, the present disclosure provides a terminal device, which includes the button assembly as described above.

In a third aspect, the present disclosure provides a control method, which is applied to the button assembly as described above, the control method includes: detecting press information by the touch assembly; generating a voltage signal according to the press information and sending to the vibration assembly; and outputting, by the vibration assembly, a vibration signal according to the voltage signal for driving the touch assembly to vibrate.

The beneficial effects of the present disclosure are as follows: when the user presses the touch assembly, the touch assembly can detect the press information. The terminal device provides a voltage signal to the piezoelectric vibration portion according to the press information, so that the piezoelectric vibration portion generates mechanical deformation to vibrate due to the inverse piezoelectric effect, then the piezoelectric vibration portion transmits the vibration to the touch assembly, enabling the user to obtain diversified tactile feedback when pressing the touch assembly.

DESCRIPTION OF EMBODIMENTS

Figure 1:
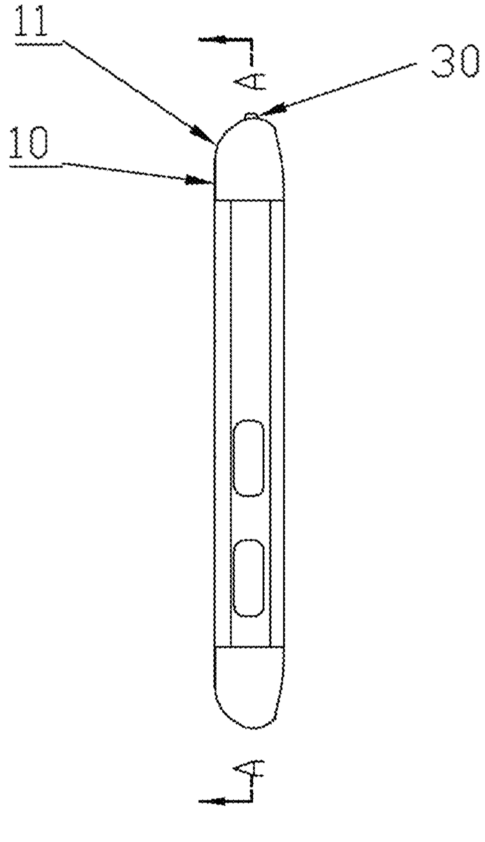
FIG. 1 is a schematic diagram of an overall structure of a button assembly according to one or more embodiments of the present disclosure.

The following will further elaborate on the present disclosure in conjunction with the drawings and embodiments.

Please refer to FIGS. 1 to 5, embodiments of the present disclosure provide a button assembly for electrical connection to a terminal device. The button assembly includes a base body 10 with a through-hole 112, a touch assembly 30 movably connected within the through-hole 112, and a vibration assembly 20 in contact with and connected to the touch assembly 30. The touch assembly 30 is exposed on one side of the through-hole 112 and is configured to detect press information. The vibration assembly 20 includes a base plate 22 that elastically supports the base body 10 and encloses to form an accommodating space together with the base body 10, and a piezoelectric vibration portion arranged on the base plate 22 corresponding to a position of the accommodating space, and the accommodating space is in communication with the through-hole 112.

One end of the touch assembly 30 facing the vibration assembly 20 is accommodated within the accommodating space and is connected to the piezoelectric vibration portion.

In an embodiment, since the touch assembly 30 is exposed on one side of the base body 10, the user can touch the touch assembly 30. Correspondingly, the touch assembly 30 can detect press information. The button assembly is electrically connected to the terminal device, and the terminal device provides a voltage signal to the piezoelectric vibration portion according to the press information, so that the piezoelectric vibration portion generates mechanical deformation and thus vibrates due to the inverse piezoelectric effect. Then the piezoelectric vibration portion transmits the vibration to the touch assembly 30, enabling the user to obtain diversified tactile feedback when pressing the touch assembly 30.

It can be understood that the piezoelectric vibration portion includes a piezoelectric sheet fixed on at least one surface of the base plate 22 along the thickness direction. When a piezoelectric sheet is fixed on the surface of the base plate 22 facing the touch assembly 30, the piezoelectric sheet is fixedly connected to the touch assembly 30. When no piezoelectric sheet is fixed on the surface of the base plate 22 facing the touch assembly 30, the base plate 22 is fixedly connected to the touch assembly 30, and the base plate 22 transmits the vibration of the piezoelectric sheet to the touch assembly 30.

In an embodiment, the touch assembly 30 is exposed on one side of the through-hole 112. Optionally, one end of the touch assembly 30 away from the vibration assembly 20 extends and protrudes through the through-hole 112. In some other embodiments, the touch assembly 30 may also be flush with the through-hole 112.

Figure 3:
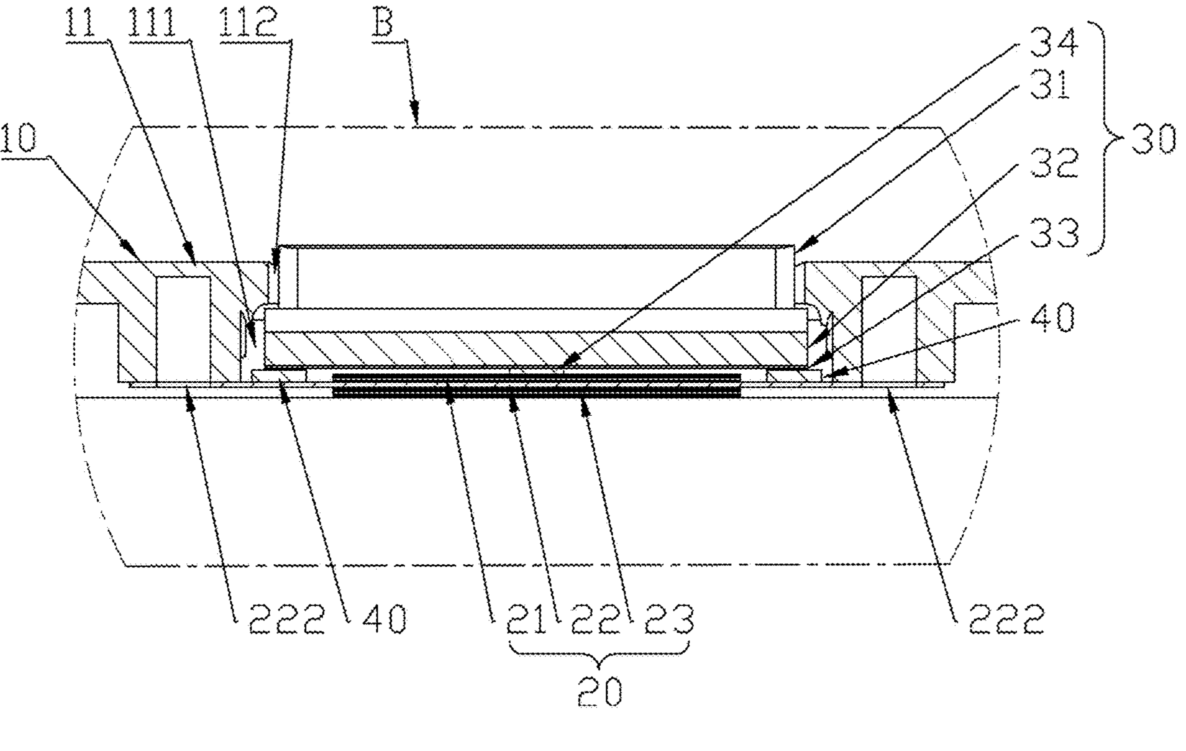
FIG. 3 is an enlarged view of detailed portion B in FIG. 2.
Figure 4:
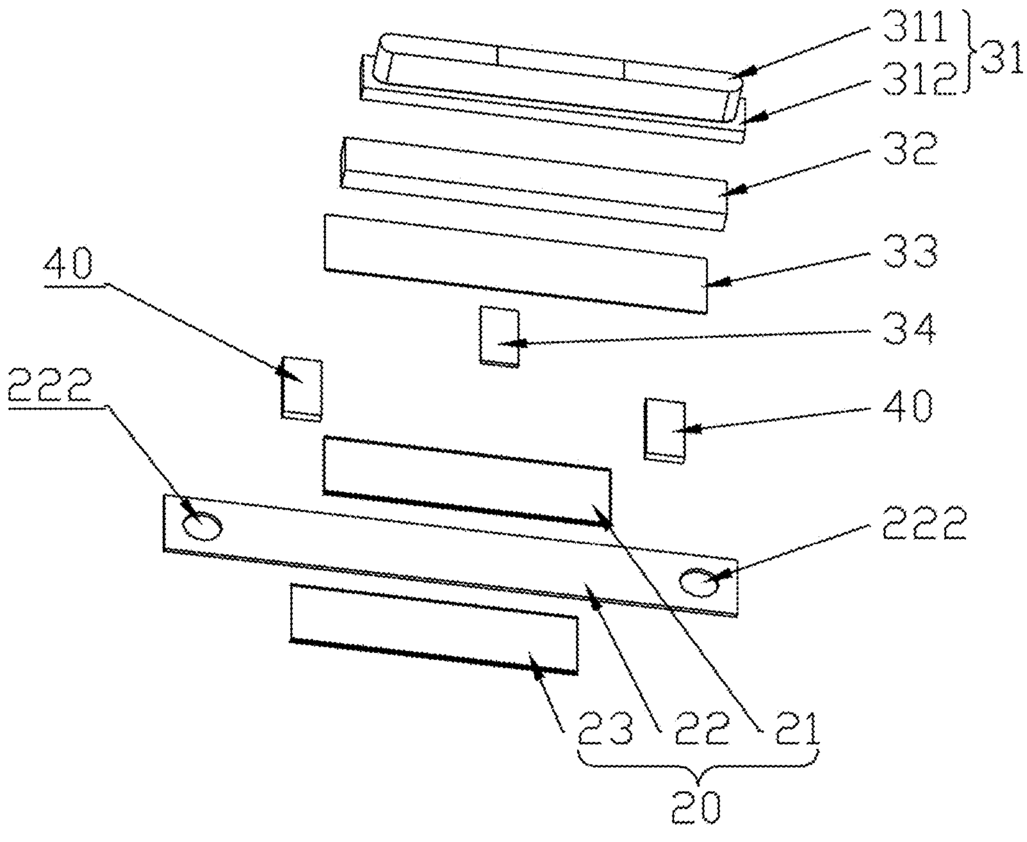
FIG. 4 is a three-dimensional exploded schematic diagram of a partial structure of a button assembly according to one or more embodiments of the present disclosure.

Further, as shown in FIGS. 3 and 4, the piezoelectric vibration portion includes a first piezoelectric sheet 21 and a second piezoelectric sheet 23 respectively fixed on the opposite surfaces of the base plate 22 along the thickness direction. The first piezoelectric sheet 21 faces the touch assembly 30 and is connected to the touch assembly 30.

In an embodiment, by respectively providing piezoelectric sheets on the opposite surfaces of the base plate 22 along the thickness direction, the mechanical vibrations obtained from the inverse piezoelectric effect of the first piezoelectric sheet 21 and the second piezoelectric sheet 23 can be superimposed, optimizing the vibration feedback effect of the button assembly and further providing the user with diversified vibration sensations.

As shown in FIG. 3, the length of the base plate 22 is greater than that of the first piezoelectric sheet 21 and the second piezoelectric sheet 23. Along the thickness direction of the base plate 22, the projections of the first piezoelectric sheet 21 and the second piezoelectric sheet 23 overlap. At least part of the surface of the base plate 22 that is not provided with the first piezoelectric sheet 21 and the second piezoelectric sheet 23 is fixedly connected to the base body 10. Optionally, along the thickness direction of the base plate 22, the symmetry centers of the first piezoelectric sheet 21 and the second piezoelectric sheet 23 coincide with the symmetry center of the base plate 22. Both ends of the base plate 22 along the length direction are fixed to the base body 10, so that the base plate 22 and the base body 10 enclose to form the accommodating space.

Optionally, the polarization direction of the first piezoelectric sheet 21 is the same as that of the second piezoelectric sheet 23, and the polarization directions of the first piezoelectric sheet 21 and the second piezoelectric sheet 23 are parallel to the thickness direction of the first piezoelectric sheet 21 and the second piezoelectric sheet 23. In this way, it is convenient for the first piezoelectric sheet 21 and the second piezoelectric sheet 23 to be energized and can avoid the conflicts between the first piezoelectric sheet 21 and the second piezoelectric sheet 23 during mechanical deformation.

Optionally, the first piezoelectric sheet 21 and the second piezoelectric sheet 23 are piezoelectric ceramic sheets. The piezoelectric ceramic sheet has a piezoelectric stack structure, with the number of stacked layers between 3 and 20 layers. The use of the piezoelectric stack structure can improve the mechanical deformation ability of the vibration assembly 20, which is beneficial for the button assembly to provide the user with a better tactile feedback.

In some embodiments, the first piezoelectric sheet 21 and the second piezoelectric sheet 23 are attached to the base plate 22 with glue. The first piezoelectric sheet 21 and the second piezoelectric sheet 23 may also be fixed to the base plate 22 by means of welding or other fixed connection manners.

Figure 5:
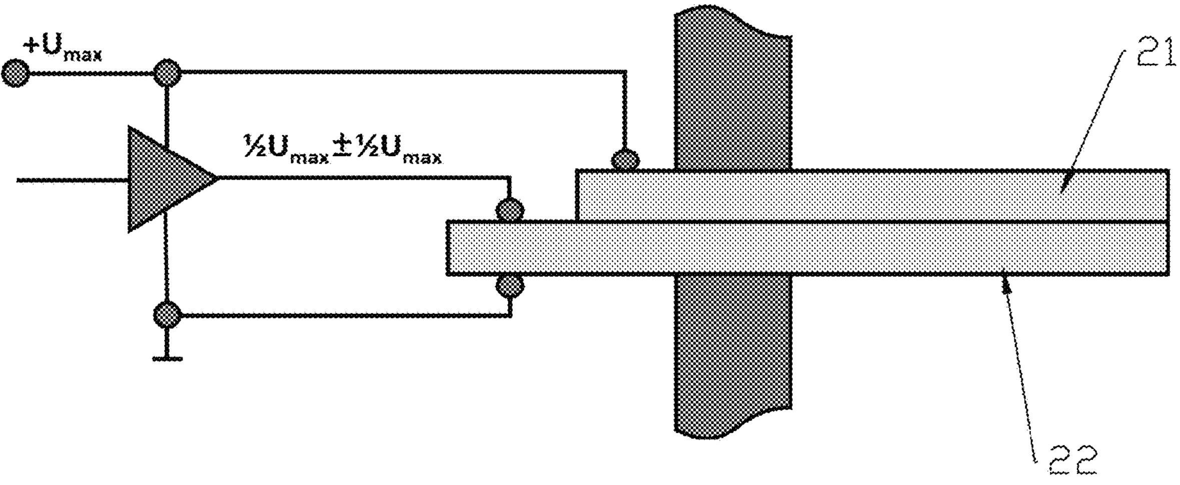
FIG. 5 is a structure schematic diagram of a piezoelectric bimorph circuit according to one or more embodiments of the present disclosure.

Further, as shown in FIG. 5, one of the first piezoelectric sheet 21 and the second piezoelectric sheet 23 is used for electrical connection to a direct current (DC) voltage source, and the other one of the first piezoelectric sheet 21 and the second piezoelectric sheet 23 is used for grounding.

In some embodiments, FIG. 5 shows a structure schematic diagram of a piezoelectric bimorph circuit. The P direction shown in FIG. 5 represents the polarization directions of the first piezoelectric sheet 21 and the second piezoelectric sheet 23. Optionally, the polarization directions of the first piezoelectric sheet 21 and the second piezoelectric sheet 23 are the thickness direction from the second piezoelectric sheet 23 to the first piezoelectric sheet 21. The first piezoelectric sheet 21 is used for electrical connection to a DC voltage source, and the second piezoelectric sheet 23 is used for grounding. A piezoelectric bimorph circuit is formed among the DC voltage source, the first piezoelectric sheet 21, the base plate 22, the second piezoelectric sheet 23, and the ground terminal.

It can be understood that in other embodiments, if the polarization directions of the first piezoelectric sheet 21 and the second piezoelectric sheet 23 are the thickness direction from the first piezoelectric sheet 21 to the second piezoelectric sheet 23, the first piezoelectric sheet 21 is used for grounding, and the second piezoelectric sheet 23 is used for electrical connection to a DC voltage source, and a piezoelectric bimorph circuit may also be formed.

Further, the base plate 22 is made of metal material, and the base plate 22 is used for electrical connection to an alternating current (AC) voltage source.

In some embodiments, the thickness of the base plate 22 is 0.05 mm to 0.5 mm, and the base plate 22 is made of stainless steel or beryllium bronze.

Optionally, as shown in FIG. 5, a DC voltage of Umax is applied to the surface of the first piezoelectric sheet 21 away from the base plate 22, the surface of the second piezoelectric sheet 23 away from the base plate 22 is grounded, and an AC voltage of 0~Umax is applied to the base plate 22. This way can avoid the energization directions of the first piezoelectric sheet 21 and the second piezoelectric sheet 23 being opposite to the polarization directions, and can also avoid the depolarization phenomenon of the first piezoelectric sheet and the second piezoelectric sheet when the DC voltage is too low. By applying a positive voltage to the base plate, the polarization states of the first piezoelectric sheet 21 and the second piezoelectric sheet 23 can be maintained, thereby prolonging the service life of the first piezoelectric sheet 21 and the second piezoelectric sheet 23 and maintaining their piezoelectric properties.

Further, as shown in FIG. 3, the touch assembly 30 includes a keycap 31 passing through the through-hole 112 from the accommodating space, and a sensor 32 arranged on one side of the keycap 31 facing the vibration assembly 20 and connected to the piezoelectric vibration portion, and the sensor 32 is used to detect the press information.

In some embodiments, the sensor 32 may be a resistive sensor, a piezoelectric sensor, a capacitive sensor, or an inductive sensor. The keycap 31 and the sensor 32 are connected by glue bonding or welding.

Further, as shown in FIGS. 3 and 4, the touch assembly 30 further includes a support sheet 33 fixed on one side of the sensor 32 away from the keycap 31, and a spacer 34 fixed on one side of the support sheet 33 away from the sensor 32 and connected to the piezoelectric vibration portion.

In some embodiments, the support sheet 33 can support the sensor 32 and the keycap 31. On the one hand, the spacer 34 can connect the vibration assembly 20 and the touch assembly 30 and transmit the vibration generated by the vibration assembly 20 to the touch assembly 30. On the other hand, the spacer 34 is arranged between the vibration assembly 20 and the touch assembly 30, so that the vibration assembly 20 and the touch assembly 30 are spaced apart, thus providing vibration space for the vibration assembly 20.

Optionally, the support sheet 33 is made of metal, and its thickness is 0.1 mm to 1 mm. The support sheet 33 is fixedly connected to the sensor 32 by bonding or welding. The spacer 34 is connected to the support sheet 33 and the first piezoelectric sheet 21 by bonding, welding, or snap-fit.

Optionally, the spacer 34 is made of metal, and its thickness is between 0.1 mm and 1 mm.

Optionally, as shown in FIG. 3, along the thickness direction of the spacer 34, the projections of the symmetry centers of the support sheet 33, the spacer 34, and the vibration assembly 20 overlap.

In some embodiments, the spacer 34 can ensure that the pressing force is evenly distributed on the vibration assembly 20 and can also evenly transmit the vibration of the vibration assembly 20 to the touch assembly 30.

In some other embodiments, there may be multiple spacers 34, not limited to only one. Multiple spacers 34 may be evenly spaced along the length direction of the support sheet 33.

Further, as shown in FIGS. 3 and 4, a plurality of stoppers 40 are also arranged on one surface of the base plate 22 facing the touch assembly 30. One end of each of the plurality of stoppers 40 facing the touch assembly 30 is spaced from the touch assembly 30.

The stoppers 40 can protect the piezoelectric vibration portion and prevent the touch assembly 30 from overpressing and damaging the piezoelectric vibration portion.

In some embodiments, as shown in FIGS. 3 and 4, one side of the spacer 34 away from the support sheet 33 is fixed to the first piezoelectric sheet 21. A plurality of stoppers 40 are also arranged on the surface of the base plate 22 facing the touch assembly 30. The thickness of each of the stoppers 40 is greater than the thickness of the first piezoelectric sheet 21, and the thickness of each of the stoppers 40 is less than the sum of the thicknesses of the spacer 34 and the first piezoelectric sheet 21.

If the user presses the touch assembly 30 with too much force, it may cause the first piezoelectric sheet 21 to break or cause the plastic deformation of the base plate 22 under pressure. In some embodiments, since the thickness of each of the stoppers 40 is greater than the thickness of the first piezoelectric sheet 21, the stoppers 40 can limit the press stroke and protect the first piezoelectric sheet 21 from being crushed under pressure. Moreover, since the thickness of each of the stoppers 40 is less than the sum of the thicknesses of the spacer 34 and the first piezoelectric sheet 21, there is a gap between the stoppers 40 and the support sheet 33, ensuring the vibration space of the vibration assembly 20.

In some embodiments, as shown in FIGS. 3 and 4, two stoppers 40 are arranged on the base plate 22. The two stoppers 40 are symmetrically distributed along the symmetry axis of the first piezoelectric sheet 21 in the width direction. The stoppers 40 can evenly distribute the pressing force onto the base plate 22, avoid the plastic deformation of the base plate 22 under pressure, thereby improving the reliability of the button assembly, and prolong the service life of the button assembly.

Optionally, the thickness of each of the stoppers 40 is 0.2 mm to 1.0 mm, and the stoppers 40 are made of metal or polymer material.

Figure 2:
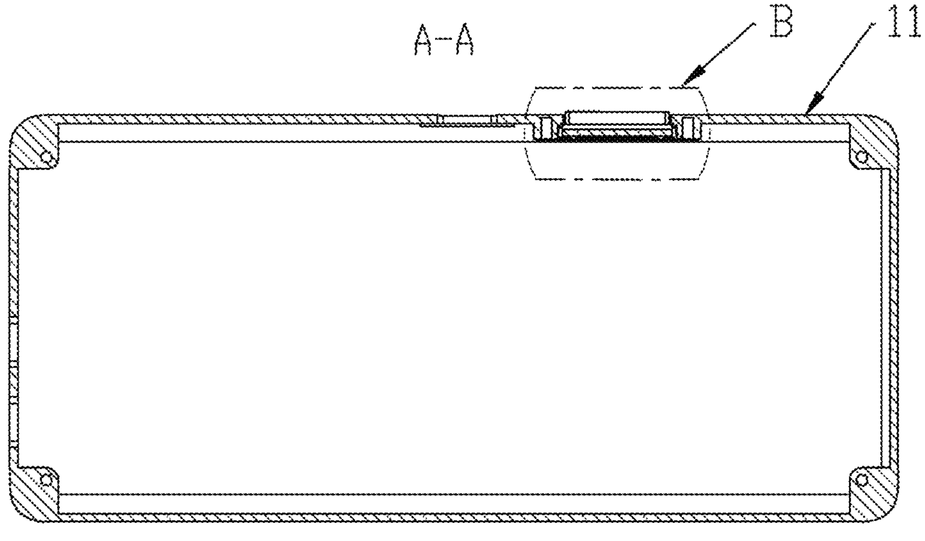
FIG. 2 is a cross-sectional view taken along a direction A-A in FIG. 1.

Further, as shown in FIGS. 2 and 3, the base body 10 includes a housing 11 with an accommodating groove 111 and bolts arranged around the accommodating groove 111. Both ends of the base plate 22 along the length direction are provided with mounting holes 222, the base plate 22 is fixedly connected to the housing 11 through the bolts passing through the mounting holes 222. The base plate 22 and the accommodating groove 111 enclose to form an accommodating space.

In some embodiments, the through-hole 112 is provided on the groove wall of the accommodating groove 111 opposite to the base plate 22. The keycap 31 further includes a base 312 accommodated within the accommodating space and a boss 311 extending and protruding from the base 312 to the side away from the base plate 22, and the boss 311 extends and protrudes through the through-hole 112 to the outside of the accommodating groove 111.

When the user does not press the keycap 31, the side of the base 312 facing the boss 311 abuts against the groove wall of the accommodating groove 111. When the user presses the keycap 31, based on the elastic deformation ability of the vibration assembly 20, the keycap 31 moves a certain press stroke in the direction towards the vibration assembly 20. The elastic deformation of the vibration assembly 20 and the vibration of the piezoelectric sheet can both provide the user tactile feedback.

Please refer to FIGS. 1 to 5, in the second aspect, the present disclosure provides a terminal device, which includes the above-mentioned button assembly.

It can be understood that the button assembly provided by the present disclosure may be applied to various terminal devices, including flat devices such as mobile phones, laptops, and tablets. The terminal device is not limited to flat devices and may also be various irregular devices such as handles, keyboards, and steering wheels.

To facilitate the understanding of the present disclosure, as shown in FIG. 2, the button assembly according to one or more embodiments of the present disclosure is exemplified by being installed to a mobile phone, but there is no limitation. In the present disclosure, the terminal device includes a shell connected to the base body 10. The base body 10 is integrally formed with the shell of the terminal device. In some other embodiments, the base body 10 may also be fixedly connected to the shell of the terminal device.

The button assembly in the present disclosure is a piezoelectric virtual button. The button assembly is electrically connected to the terminal device, the terminal device provides a voltage signal to the piezoelectric vibration portion according to the press information, so that the piezoelectric vibration portion generates vibration through the inverse piezoelectric effect and transmits it to the touch assembly 30. Thus, the button assembly can generate a variety of different vibration effects according to the detected press information, providing the user with diversified tactile feedback.

Figure 6:
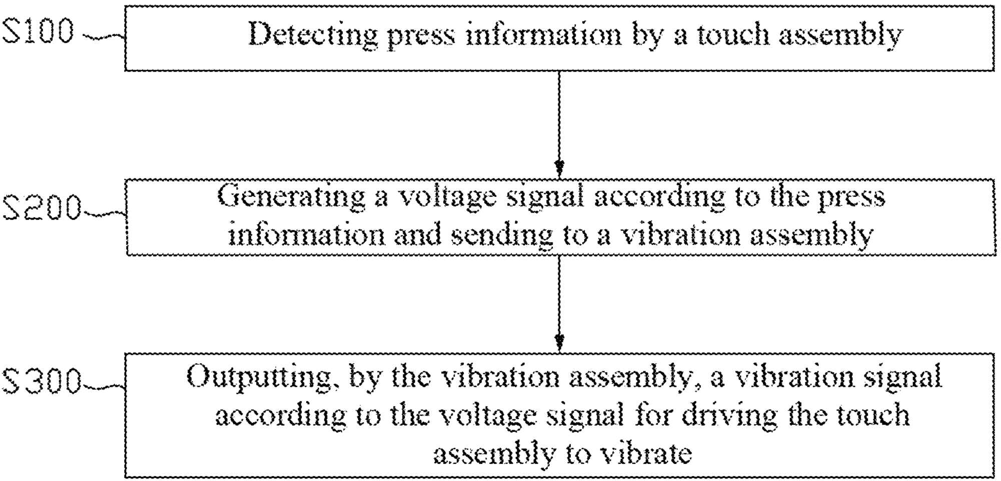
FIG. 6 is a flowchart of a control method according to one or more embodiments of the present disclosure.

As shown in FIG. 6, in the third aspect, the present disclosure provides a control method, which is applied to the above-mentioned button assembly and the control method includes one or more of the following steps.

Step S100: detecting press information by the touch assembly.

Step S200: generating a voltage signal according to the press information and sending to the vibration assembly.

Step S300: outputting, by the vibration assembly, a vibration signal according to the voltage signal for driving the touch assembly to vibrate.

In the above embodiments, the description of each embodiment focuses on different aspects, for the parts not elaborated in a certain embodiment, reference can be made to the relevant descriptions of other embodiments.

The above are only embodiments of the present disclosure. It should be noted that for those of ordinary skill in the art, without departing from the concept of the present disclosure, improvements can still be made, but all fall within the protection scope of the present disclosure.

What is claimed is:

1. A button assembly for providing tactile feedback, configured for electrical connection to a terminal device, comprising:

a base body with a through-hole;

a touch assembly movably connected within the through-hole, wherein the touch assembly is exposed on one side of the through-hole and is configured to detect press information, and a vibration assembly in contact with and connected to the touch assembly, wherein the vibration assembly comprises a base plate and a piezoelectric vibration portion, the base plate elastically supports the base body and encloses to form an accommodating space together with the base body, the piezoelectric vibration portion is arranged on the base plate at a position corresponding to the accommodating space, and the accommodating space is in communication with the through-hole;

wherein one end of the touch assembly facing the vibration assembly is accommodated within the accommodating space and is connected to the piezoelectric vibration portion or the base plate; and the piezoelectric vibration portion comprises a first piezoelectric sheet and a second piezoelectric sheet respectively fixed on opposite surfaces of the base plate along a thickness direction, and the first piezoelectric sheet faces the touch assembly and is connected to the touch assembly;

wherein one of the first piezoelectric sheet and the second piezoelectric sheet is configured for electrical connection to a direct current voltage source, and the other one of the first piezoelectric sheet and the second piezoelectric sheet is configured for grounding; the base plate is configured for electrical connection to an alternating current voltage source; the polarization direction of the first piezoelectric sheet is the same as that of the second piezoelectric sheet, and the polarization directions of the first piezoelectric sheet and the second piezoelectric sheet are parallel to the thickness direction of the first piezoelectric sheet and the second piezoelectric sheet.

2. The button assembly as described in claim 1, wherein the base plate is made of metal material.

3. The button assembly as described in claim 1, wherein the touch assembly comprises a keycap passing through the through-hole from the accommodating space, and a sensor arranged on one side of the keycap facing the vibration assembly and connected to the piezoelectric vibration portion, and the sensor is configured to detect the press information.

4. The button assembly as described in claim 3, wherein the touch assembly further comprises a support sheet fixed on one side of the sensor away from the keycap, and a spacer fixed on one side of the support sheet away from the sensor and connected to the piezoelectric vibration portion.

5. The button assembly as described in claim 4, wherein a thickness of the support sheet is 0.1 mm to 1 mm, and a thickness of the spacer is 0.1 mm to 0.5 mm.

6. The button assembly as described in claim 1, wherein a plurality of stoppers are arranged on one surface of the base plate facing the touch assembly, and one end of each of the plurality of stoppers facing the touch assembly is spaced apart from the touch assembly.

7. The button assembly as described in claim 1, wherein the base body comprises a housing with an accommodating groove and bolts arranged around the accommodating groove, both ends of the base plate along a length direction are provided with mounting holes, the base plate is fixedly connected to the housing via the bolts passing through the mounting holes, and the base plate and the accommodating groove enclose to form the accommodating space.

8. The button assembly as described in claim 1, wherein a thickness of the base plate is 0.05 mm to 0.5 mm.

9. A terminal device, comprising the button assembly as described in claim 1.

10. A control method, applied to the button assembly as described in claim 1, wherein the control method comprises:

detecting press information by the touch assembly;

generating a voltage signal according to the press information and sending to the vibration assembly; and outputting, by the vibration assembly, a vibration signal according to the voltage signal for driving the touch assembly to vibrate.

* * * * *